US012729797B2

(12) United States Patent
Tukiainen

(10) Patent No.: US 12,729,797 B2
(45) Date of Patent: Sep. 8, 2026

(54) GUIDE FOR GUIDING AN INFLATABLE BLADDER WITHIN A PIPELINE AND A BLADDER ASSEMBLY

(71) Applicant: BOLDAN OY, Rajamäki (FI)

(72) Inventor: Joni Tukiainen, Rajamäki (FI)

(73) Assignee: BOLDAN OY, Rajamäki (FI)

( * ) Notice: Subject to any disclaimer, the term of this patent is extended or adjusted under 35 U.S.C. 154(b) by 378 days.

(21) Appl. No.: 18/442,137

(22) Filed: Feb. 15, 2024

(65) Prior Publication Data

US 2024/0280205 A1 Aug. 22, 2024

(30) Foreign Application Priority Data

Feb. 16, 2023 (EP) .................................... 23156975

(51) Int. Cl.
*F16L 55/165* (2006.01)

(52) U.S. Cl.
CPC ................................ *F16L 55/1654* (2013.01)

(58) Field of Classification Search
CPC . F16L 55/165; F16L 55/1651; F16L 55/1652; F16L 55/1653; F16L 55/1654; F16L 55/1655; F16L 55/1656; F16L 55/1657; F16L 55/1658; F16L 55/26; F16L 2101/00; F16L 2101/10; F16L 2101/12; F16L 2101/16; F16L 2101/18; F16L 2101/20; F16L 2101/30; F16L 2101/40; F16L 2101/50; F16L 2101/60; F16L 2101/70
USPC .............................................. 138/97, 98, 99
See application file for complete search history.

(56) References Cited

U.S. PATENT DOCUMENTS 2,455,273 A * 11/1948 Schott ..................... B08B 9/051 15/104.12
3,665,966 A * 5/1972 Ver Nooy ............ F16L 55/124 138/93
3,703,947 A * 11/1972 Landrum ............... F16D 57/00 188/290
3,890,905 A * 6/1975 Clavin ................... F16L 55/32 269/48.1
3,979,941 A * 9/1976 Auxer ...................... B21D 5/00 72/466
(Continued)

FOREIGN PATENT DOCUMENTS

CN 111219563 A 6/2020
CN 112762274 A 5/2021
(Continued)

*Primary Examiner* — William M Mccalister
(74) *Attorney, Agent, or Firm* — S.J. INTELLECTUAL PROPERTY LTD.

(57) ABSTRACT

The disclosure relates to a guide (1) for guiding an inflatable bladder (2) within a pipeline (3). The guide (1) comprises roller units (6) for supporting the guide (1) against an inner wall of a pipeline (3), at least one of which roller units (6) being supported on a roller bracket (5), in turn arranged on an attachment rail (7) allowing said roller bracket (5) to be movable between different positions on the bracket rail (7), so as to accommodate for various pipeline (3) dimensions. At least one roller unit has a limited travel (T), while a biasing member (8) is configured to bias the roller unit (6) with a limited travel (T) outwardly with respect to the central axis (C) along the limited travel (T). A bladder assembly (10) is also disclosed.

14 Claims, 3 Drawing Sheets

(56) References Cited

U.S. PATENT DOCUMENTS

| | | | | |
|---|---|---|---|---|
| 4,050,384 | A * | 9/1977 | Chapman | F28G 15/02 73/866.5 |
| 4,055,315 | A * | 10/1977 | Gvelesiani | F16L 55/38 104/168 |
| 4,457,236 | A * | 7/1984 | Akhmadiev | F16L 55/18 105/365 |
| 4,499,991 | A * | 2/1985 | Allen | B23Q 7/1468 198/465.1 |
| 6,123,027 | A * | 9/2000 | Suyama | F16L 55/28 104/138.2 |
| 6,626,447 | B2 * | 9/2003 | Nelson | F16L 55/28 280/79.11 |
| 8,347,477 | B2 * | 1/2013 | Kakine | B29C 53/72 29/402.09 |
| 2018/0031166 | A1 * | 2/2018 | Urbanski | F16L 55/26 |

FOREIGN PATENT DOCUMENTS

| | | | |
|---|---|---|---|
| CN | 113566048 | A | 10/2021 |
| EP | 2256396 | A1 | 12/2010 |
| WO | 2016137936 | A1 | 9/2016 |

* cited by examiner

GUIDE FOR GUIDING AN INFLATABLE BLADDER WITHIN A PIPELINE AND A BLADDER ASSEMBLY

FIELD OF THE DISCLOSURE

The present disclosure relates to introducing inflatable bladders into a pipeline, and more particularly to guides for facilitating such introduction. The present disclosure further concerns a bladder assembly incorporating such a guide.

BACKGROUND OF THE DISCLOSURE

Pipelines, such as sewers, may be repaired or rehabilitated by introducing a resin impregnated liner into the pipeline, and subsequently curing the resin impregnated liner within the pipeline. Particularly with pipelines with a relatively large diameter and/or at branches of the pipeline, a separate inflatable bladder provided within the liner may be used to press the liner in correct form against the inner wall of the pipeline. Such bladders are also often used in repairing short sections of the pipeline, e.g., in cases where individual defects are repaired. Particularly, such a bladder is inserted into its respective liner in a deflated state, introduced into a correct position and orientation within the pipeline, and subsequently inflated, such that the liner assumes a form corresponding to that of the pipeline and is pressed against the inner wall of the pipeline. Also, when branch liners are being installed, inflation of the bladder pushes a lateral branch of the liner into the corresponding lateral branch of the pipeline.

Typically, such bladders, along with their respective liners, are introduced into place within the pipeline, and possibly aligned with the branches, using guides attached to the bladder. Such guides are commonly also referred to as packers. To facilitate introduction of the bladder into the pipeline, such guides may be provided with rollers for supporting it against the inner wall of the pipeline.

Publication WO 2016/137936 A1 discloses packer equipped with radially outwardly extending rollers for supporting said packer against an inner surface of a pipeline.

BRIEF DESCRIPTION OF THE DISCLOSURE

An object of the present disclosure is to provide a guide for guiding an inflatable bladder within a pipeline, which guide can be adapted for pipelines of different sizes, and which provides for compensation of irregularities within the pipeline. It is a further object of the present application to provide a bladder assembly incorporating such a guide.

The object of the disclosure is achieved by a guide and a bladder assembly which are characterized by what is stated in the independent claims. The preferred embodiments of the disclosure are disclosed in the dependent claims.

The disclosure is based on the idea of providing a guide equipped with roller units, one or more of which are adjustably fixed to the guide body, such that the rollers may be adjusted to engage the inner wall of pipelines of various sizes. That is, the lateral protrusion of one or more of the rollers from the remaining guide is adjustable. Moreover, at least one of the rollers is provided with a limited travel and biased outwardly along said limited travel, so as to adapt to irregularities within the pipeline.

Arrangements according to the present disclosure allow the same guide to be used in pipelines of different inner diameters, while simultaneously insertion of the guide into the pipelines is improved, as the limited travel of the roller(s) allow compensation for any irregularities of the pipeline's inner wall (e.g., the inner diameter) and reduce the risk of the roller(s) getting stuck at a branch of the pipeline.

BRIEF DESCRIPTION OF THE DRAWINGS

In the following, the disclosure will be described in greater detail by means of preferred embodiments with reference to the accompanying drawings, in which.

DETAILED DESCRIPTION OF THE DISCLOSURE

Figure 1:
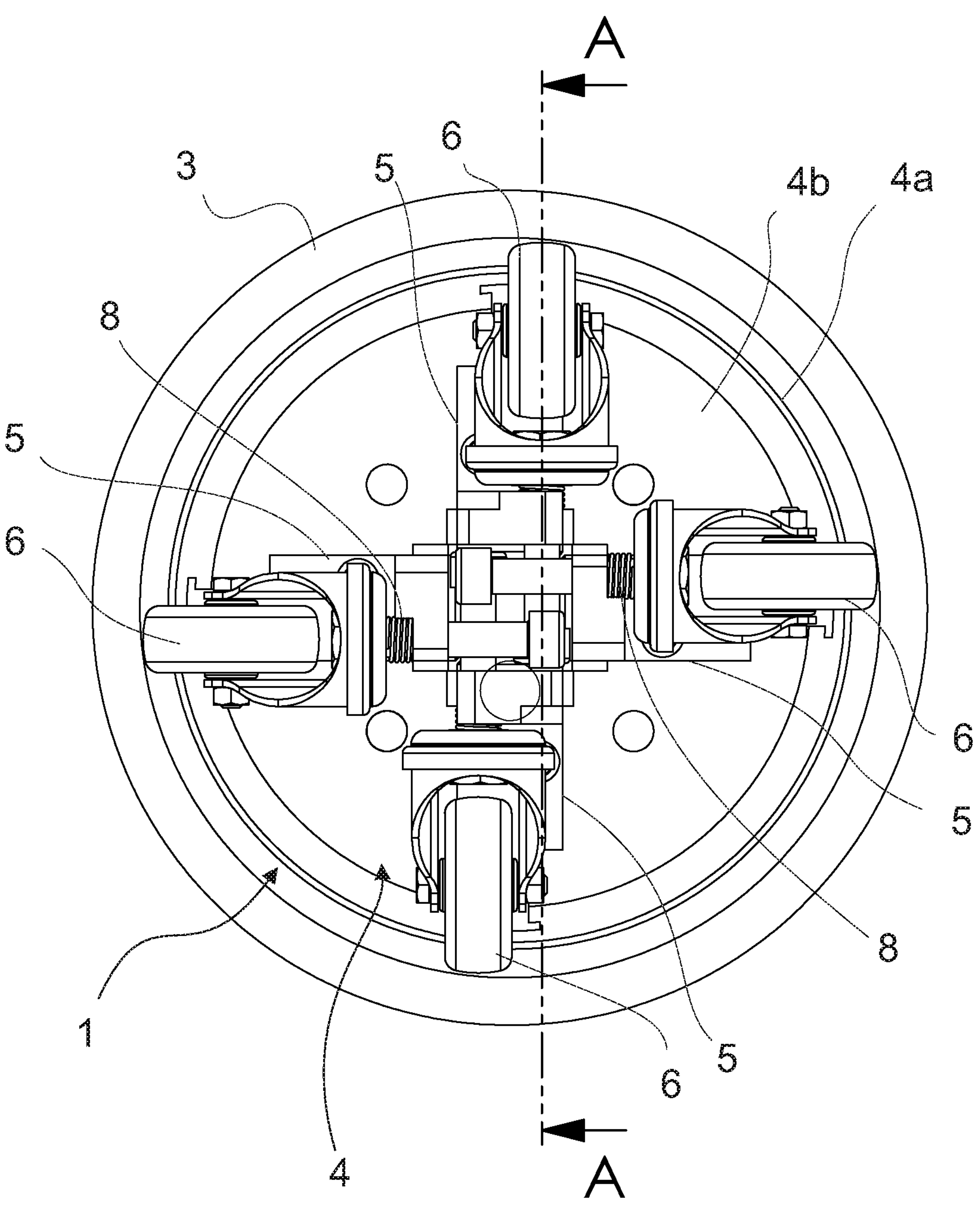
FIG. 1 schematically illustrates a guide according to an embodiment of the present disclosure inserted within a pipeline, as seen along a central axis.

According to a first aspect of the present disclosure, a guide 1 for guiding an inflatable bladder 2 within a pipeline 3 is provided.

The guide 1 comprises a guide body 4 defining a central axis C. Suitably, the central axis C defines a direction along with the guide is intended to be inserted to and withdrawn from the pipeline. In other words, the central axis C of the guide body 4 is suitably parallel, preferably coaxial, with a longitudinal axis of the pipeline, when the guide 1 is inserted said pipeline 3.

Moreover, the guide body 4 is attachable to the inflatable bladder 2. For example, the guide body 4 may comprise an outer surface against which the bladder 2 may be clamped. That is, the guide body 4 may be partially insertable within an opening of the bladder 2, such that the bladder 2 may be tightened around such an outer surface, e.g., with a band clamp, strap, tape, adhesives, or any combination thereof.

The guide 1 further comprises two or more roller brackets 5 arranged on the body 4. The roller brackets 5 are equipped with a roller unit 6 for supporting the guide 1 against an inner wall of the pipeline 3. That is, the roller units 6 protrude outwardly from the guide body 4 in a direction transverse to the central axis C, i.e., towards the inner wall of the pipeline 3.

Particularly, the guide 1 further comprises an attachment rail 7 extending in a direction transverse with respect to the central axis C. In the context of this disclosure, the term rail is used to describe a structural support member on which a roller bracket 5 may be supported. That, is such a rail 7 may be provided in various shapes or form, including a longitudinal protrusion or a longitudinal recess (e.g., a slot).

The attachment rail 7 may be arranged as a slot **7*a* on the guide body 4, or alternatively, the attachment rail 7 may be arranged as a protrusion on the body 4**.

Should the attachment rail 7 be arranged as a slot **7*a* on the guide body 4, the roller bracket 5 arranged on the attachment rail 7 comprises a protrusion 5*a* received within said slot 7*a*, said protrusion 5*a* having a cross-sectional shape corresponding to that of the slot 7*a*. Although such a protrusion 5*a* may be arranged integrally on the roller bracket 5, this is not necessary. That is, a protrusion may alternatively be provided as a separate component having a cross-sectional shape matching that of the corresponding slot 7*a* and being attached to the roller bracket 5**. Examples of such separate protrusions include a T-slot nut and a T-slot bolt.

Should the attachment rail 7 be arranged as a protrusion on the body 4, the roller bracket 5 arranged on the attachment rail 7 comprises a slot having a cross-sectional shape corresponding to that of the protrusion, which protrusion is received within said slot.

In either case, the slot and protrusion are preferably, but not necessarily, of a T-profile cross-sectional shape.

At least one roller bracket 5 is arranged on the attachment rail 7. The roller bracket 5 arranged on the attachment rail 7 has a fixed configuration in which said roller bracket 5 is releasably fixed with respect to the attachment rail 7. In addition, the roller bracket 5 arranged on the attachment rail 7 has a released configuration, in which said roller bracket 5 is movable between different positions on the bracket rail 7. This allows for the roller unit 6 to be moved inwardly or outwardly with respect to the guide body 4 so as to correspond to the inner diameter of the pipeline 4 of various sizes. Consequently, a single guide 1 may be used for different pipeline 3 diameters. Advantageously, the roller bracket 5 is movable along the attachment rail 7 (e.g., slidable along the attachment rail 7) when in the released configuration.

Moreover, at least one roller unit 6 is coupled to its respective roller bracket 5 with a limited travel T extending in a direction transverse to the central axis C. The guide 1 further comprises a biasing member 8 configured to bias the roller unit 6 with a limited travel T outwardly with respect to the central axis C along the limited travel T. This allows for the roller unit to conform with local changes and irregularities on the inner wall of the pipeline. Such irregularities may be caused e.g., by pipeline damage, accumulation of debris, and manufacturing and/or installation tolerances. At the same time, the limited travel T prevents a roller unit from plunging into a branch opening of the pipeline and getting stuck therein.

Suitably, such a biasing member 8 may be provided as spring, such as a helical spring disk spring. Alternatively, or in addition, the biasing member may made of a resilient material such as a suitable elastomer.

Preferably, but not necessarily, the roller unit 6 with limited travel T is coupled to the roller bracket 5 arranged on the attachment rail 7. Suitably, the direction of the limited travel T is parallel with the direction in which the attachment tail 7 extends.

Preferably, the limited travel of the roller unit 6 is arranged parallel with the attachment rail 7.

In an embodiment of the first aspect according to the present disclosure, the roller bracket 5 arranged on the attachment rail 7 is slidably moveable along said attachment rail 7 when in the released configuration. This allows the roller bracket 5 to be precisely and securely adjusted to correspond to the size of the pipeline 2.

In an embodiment of the first aspect according to the present disclosure, the roller bracket 5 arranged on the attachment rail 7 comprises a locking element 9 movable between a locked position, in which the roller bracket 5 is in the fixed configuration, and a released position, in which the roller bracket 5 is in the released configuration.

For example, the locking element 9 may be provided as a longitudinal locking element 9 equipped with an external thread engaging with an internal thread provided on a through hole on the roller bracket 5, so as to allow the longitudinal locking element 9 to be moved into contact with the guide body 4, and respectively away from the body.

In an alternative example, the locking element may comprise a rod extending through the roller bracket 5 and connected to a protrusion of the roller bracket 5, the protrusion being provided as a separate component from the roller bracket. Furthermore, the protrusion is arranged as movable away and towards the remaining roller bracket 5, so as to clamp the roller bracket 5 against the body 4 of the guide when in the locked position. That is, the rod may be coupled to the protrusion so as to move it towards and away from the remaining roller bracket. This, in turn, could be achieved with threaded engagement between the protrusion and the rod and/or between the rod and a lever, nut or knob. It may also be envisaged that such a rod is coupled with a clamping lever, preferably having an over-the-centre locking properties, for achieving movement of the protrusion. For example, the rod could be provided with an external thread engaging with an internal thread of a nut (such as a T-nut) received within a slot and constituting the protrusion of the roller bracket, or the rod and protrusion could be provided integrally as a bolt (such as a T-bolt), the head of which is received within the slot.

In an alternative example, the locking element may be provided as an indexing plunger. In such a case an indexing pin of the indexing plunger may be extended into a locked position, and respectively, retracted into a released position. In the locked position, the pin engages with a corresponding hole provided, e.g., on the end surface **4*b* or on the attachment rail 7. Naturally, multiple such corresponding holes may be provided, so as to allow locking of the roller bracket 5** in various positions. Moreover, the indexing plunger may be operated with a release knob, which allows pulling the indexing pin into the released position, while being spring-biased into the locked position. Alternatively, the indexing plunger may be operated with a cam or lever, the rotation of which moves the indexing pin between the locked and released positions.

In an embodiment of the first aspect according to the present disclosure, the roller unit 6 is pivotable about a pivot axis transverse to the central axis C. This allows the roller unit to orient itself to accommodate to the movement of the guide 1. This is particularly beneficial when installing branch liners, where the guide additionally needs to be rotated about the central axis to align the rotational position of the liner and bladder with that of the branch(es). As the roller unit 6 is pivotable, it may be rotated so as to allow rolling contact with the inner wall of the pipeline also when the guide is rotated about the central axis C. Preferably, but not necessarily, such a pivot axis is perpendicular to the central axis C.

In an embodiment of the first aspect according to the present disclosure, the roller unit 6 comprises an omni-wheel. Omni-wheels are often referred to as omnidirectional wheels or poly wheels, i.e., wheels with relatively smaller rollers around the circumference of the wheel. Such rollers are typically arranged with a turning direction transverse to that of the wheel. This is particularly beneficial when installing branch liners, where the guide additionally needs to be rotated about the central axis C to align the rotational position of the liner and bladder with that of the branch(es). As omni-wheels allow multiple turning directions, they allow rolling contact with the inner wall of the pipeline also when the guide is rotated about the central axis C.

In an embodiment of the first aspect according to the present disclosure, the body 4 comprises a cylindrical section **4*a* extending along the central axis C and an end surface 4*b* at a longitudinal end of the cylindrical section 4*a*. Advantageously, the attachment rail 7 is arranged on the end surface 4*b*. Moreover, the end surface 4*b*** is suitably arranged transverse, preferably perpendicular, with respect to the central axis C.

In an embodiment of the first aspect according to the present disclosure, the guide 1 comprises at least three, preferably at least four attachment rails 7 equipped with respective roller brackets 5 and roller units 6. Naturally, the guide may be provided with additional attachment rails 1 in any number deemed appropriate to provide sufficient support.

In an embodiment of the first aspect according to the present disclosure, the guide 1 comprises a number of roller brackets 5 and respective roller units 6 corresponding to the number of attachment rails 7. That is, each roller unit 6 is supported on a roller bracket 5, in turn supported on an attachment rail 7.

It should be noted that the first aspect of the present disclosure encompasses any combination of two or more embodiments, or variants thereof, as discussed above.

According to a second aspect of the present disclosure, a bladder assembly 10 for installing a pipe liner within a pipeline 3 is provided. The bladder assembly 10 comprises a flexible, inflatable bladder 2 having an opening. The bladder 2 is suitably made of silicone although other elastic materials may be used. Moreover, such a bladder 2 is suitably of a elongate form.

The bladder assembly 10 further comprises a guide 1 as discussed above in connection with the first aspect of the present disclosure. The guide 1 is at least partially received within the opening of the bladder 2 such that the roller unit(s) 6 reside outside the bladder 2. Advantageously, the bladder 2 is sealed to against the guide 1 such that fluid communication via the opening corresponding to the guide 1 is only permitted through a fluid channel arranged on the guide 1. Most suitably, the bladder 2 is sealed against an outer surface of the guide body 4 by means of a band clamp, strap, tape, adhesives, or any combination thereof.

The bladder assembly 10 may suitably further comprise a guide rod or cable attached to a part of the guide 1 residing outside the bladder 2. Such a guide rod is preferably rigid enough to allow the bladder assembly 10 to be pushed along the pipeline 3, while simultaneously flexible enough to allow the bladder assembly 10 to pass through bends of the pipeline 3. Moreover, the guide rod suitably exhibits sufficient torsional stiffness to allow the bladder assembly 10 to be rotated as a single unit about the central axis C. This kind of an arrangement allows the bladder assembly 10 to be manipulated within the pipeline 3 as a single unit, i.e., to position the bladder 2 and liner in a correct longitudinal position and a rotational orientation.

When in use, the bladder assembly 10 is inserted within a corresponding liner impregnated with resin, while the bladder 2 is deflated. It should be noted that the bladder 2 and the liner are chosen to correspond to the shape and form of the section of the pipeline 3 being repaired. The bladder assembly 10 along with the liner is then inserted within the pipeline 3 into a desired position and orientation, where a pressurized medium is introduced into the bladder, thereby inflating it. The inflated bladder 2 pushes the liner to assume its intended form against the inner walls of the pipeline 3. Subsequently, a thermal medium (such as a flow of steam), is introduced within the bladder so as to heat the resin impregnated in the liner and activate the curing process thereof. After the resin has cured, the bladder may be deflated again and the bladder assembly 10 removed from the hardened liner and pipeline 3.

Most suitably, the bladder 2 has a longitudinal main section with opening at each of its longitudinal ends. The bladder 2 may further comprise a branch section extending laterally from the main section between the longitudinal ends thereof. Moreover, the inside of the branch section is suitably open to, or at least in fluid communication with the inside of the main section. In such a case, a separate guide 1 is suitably arranged at each longitudinal end of the bladder 2, at least partially received within a respective opening of the bladder such that at the roller units 6 of the guide reside outside of the bladder 2.

At least one, preferably both of the guides 1 are suitably equipped with pressurized fluid connectors for allowing a pressurized medium (such as pressurized air) to be introduced within the bladder so as to inflate it. To this end, the guides 1 may be provided with an internal pressure channel extending therethrough, for example.

Moreover, at least one, preferably both of the guides 1 are suitably equipped with thermal fluid connectors for allowing a heated medium (such as steam) to be introduced within the bladder 2 to activate curing of a resin impregnated within a liner covering the bladder. To this end, the guides 1 may be provided with an internal thermal channel extending therethrough, for example.

It should be noted that such pressure connectors and thermal connectors, and any associated channels, may be provided either as separate entities (separate pressure connectors, thermal connectors and associated channels), or alternatively, as common shared entities (i.e., both the pressurized medium and the thermal medium are introduced via common connectors and associated channels).

Preferably, the guides 1 at opposing ends of the main section are coupled to each other via an intermediate rod, which resides within the bladder when in use. Such an intermediate rod is preferably rigid enough to allow the bladder assembly 10 to be pushed along the pipeline 3, while simultaneously flexible enough to allow the bladder assembly 10 to pass through bends of the pipeline 3. Moreover, the intermediate rod suitably exhibits sufficient torsional stiffness to allow the bladder assembly 10 to be rotated as a single unit about the central axis C. This kind of an arrangement allows the bladder assembly to be manipulated within the pipeline 3 as a single unit, i.e., to position the bladder and liner in a correct longitudinal position and a rotational orientation without twisting or warping the bladder 2.

It should be noted that the second aspect of the present disclosure encompasses any combination of two or more embodiments, or variants thereof, as discussed above.

FIG. 1 schematically illustrates a guide 1 according to an embodiment of the present disclosure as seen along a central axis. Particularly, in the situation of FIG. 1 the guide 1 is inserted within a pipeline 3 and is viewed from a side opposite to that on which the bladder 2 is to be attached.

The guide 1 is provided with a guide body 4 having a cylindrical section 4*a* having an end surface 4*b*. Four roller brackets 5 are provided on the guide body 4, namely on the end surface 4*b* thereof. Each roller bracket 5 supports a respective roller unit 6, which in turn engage with the inner surface of the pipeline 3, so as to support the guide 1 in rolling contact on the inner surface of the pipeline 3.

The roller units 6 are attached to the roller brackets 6, each with a respective limited travel in a direction transverse to the central axis of the guide 1 (i.e. transverse the longitudinal direction of the pipeline). In the embodiment of FIG. 1, this is achieved by attaching roller units 6 to their respective roller brackets 5 with a headed shank (e.g., a bolt with a non-threaded shank portion intermediate to the head and the threaded portion) extending through a hole in the roller bracket 5 such that the shank portion slides freely with respect to the bracket 5. In addition, biasing members 8, provided as coil springs in the embodiment of FIG. 1, are arranged between the roller bracket 5 and the roller unit 6, thereby biasing the roller units 6 outwardly towards the inner wall of the pipeline. This ensures that contact is maintained between the roller units 6 and the inner wall of the pipeline 3 as the guide 1 is moved along the pipeline 3, even when irregularities of the inner wall are exhibited. Specifically, in the situation of FIG. 1, the roller units 6 are shown pressed towards an inner position of their limited travel against their respective biasing members 8.

Figure 2:
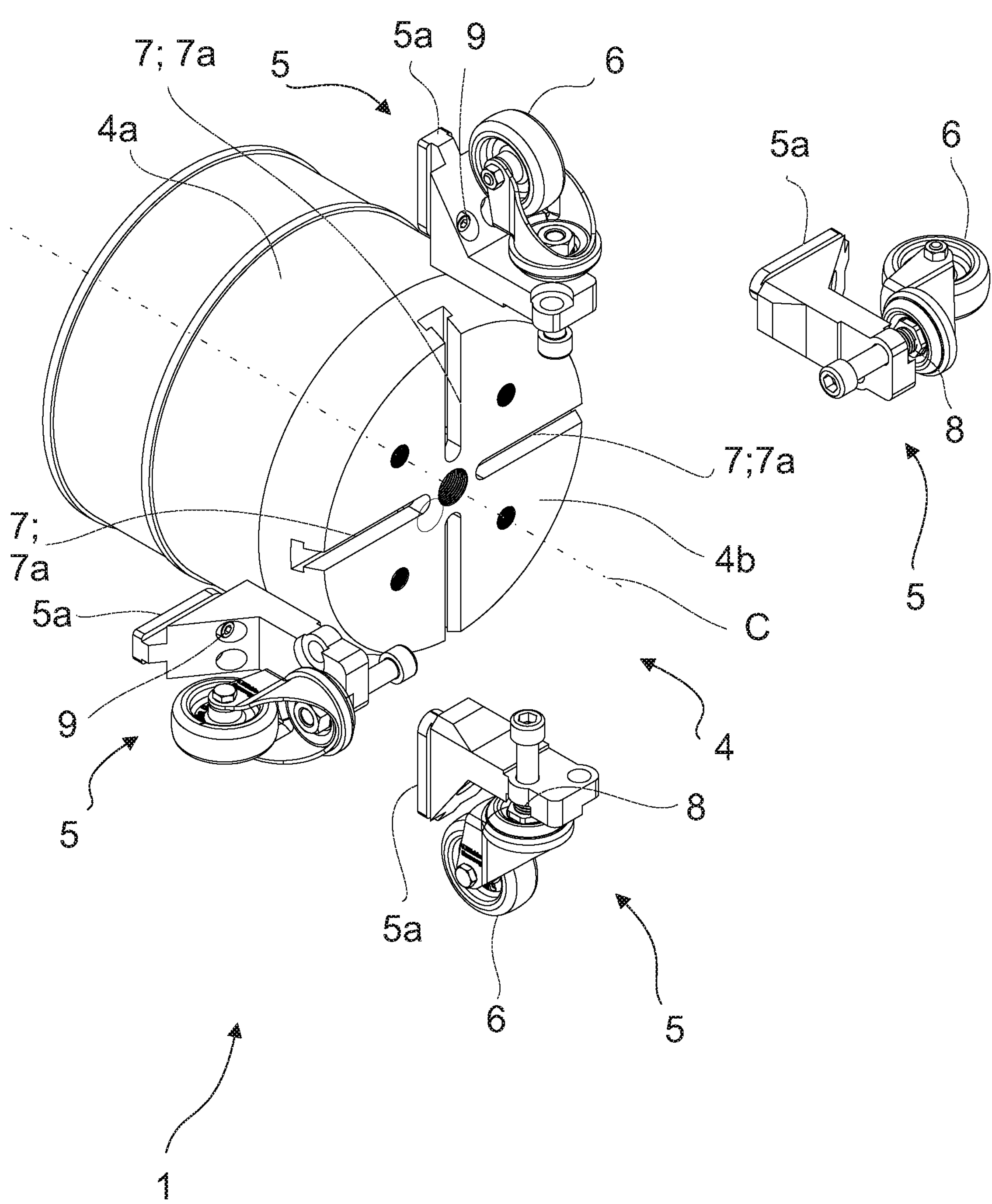
FIG. 2 schematically illustrates the guide of FIG. 1 in an exploded configuration, as seen as a perspective view.

FIG. 2 schematically illustrates the guide of FIG. 1 in an exploded configuration shown a perspective view. That is, the roller brackets 5 have been detached from the guide body 4. It should be noted that detachment of the roller brackets 5 is not typically necessary during adjustment of the guide 1 to accommodate for various pipeline 3 sizes, but the exploded configuration is shown in this connection for exemplary purposes.

Particularly, FIG. 2 illustrates how the attachment rails 7 are provided on the end surface 4*b* as slots 7*a* with a T-shaped cross-sectional profile. Moreover, the roller brackets 5 are provided with a protrusion 5*a* matching the T-shaped cross-sectional profile of the slots 7*a*, such that the roller brackets may slide along the attachment rail 7. The slots 7*a* are open towards the periphery of the end surface 4*b*, so as to allow insertion of the protrusions 5*a* into the slots 7*a*.

FIG. 2 also shows locking members 9 arranged on the roller brackets 5. In this particular embodiment, the locking members 9 are provided as bolts engaging with a threaded through hole on the roller bracket, such that the locking members 9 may be threaded inwardly (locked position) to engage and abut against the end surface 4*b* so as to secure the position of the roller bracket 5 (fixed configuration). Correspondingly, the locking members 9 may be threaded outwardly (released position) to disengage from the end surface 4*b*, thereby allowing the roller brackets 5 to be repositioned by sliding along the attachment rail 7 (released configuration).

Furthermore, FIG. 2 shows multiple holes provided on the end surface 4*b* of the guide 1. Such holes can be used, for example, coupling a guide rod for manipulating the position and orientation of the guide 1, and/or as fluid channels for providing fluid communication through the guide body 4 for a pressurized fluid medium, thermal fluid medium, or both.

FIG. 2 also clearly illustrate the cylindrical section 4*a* of the guide body 4*a*. In the illustrated embodiment, it is particularly the cylindrical section 4*a* onto which the bladder 2 Is indented to be attached and sealed. To this end, one or more annular beads running around the circumference of the cylindrical sections 4*a* may be provided. Such a bead or beads help to retain a bladder 2 attached around the cylindrical section 4*a* in place.

Figure 3:
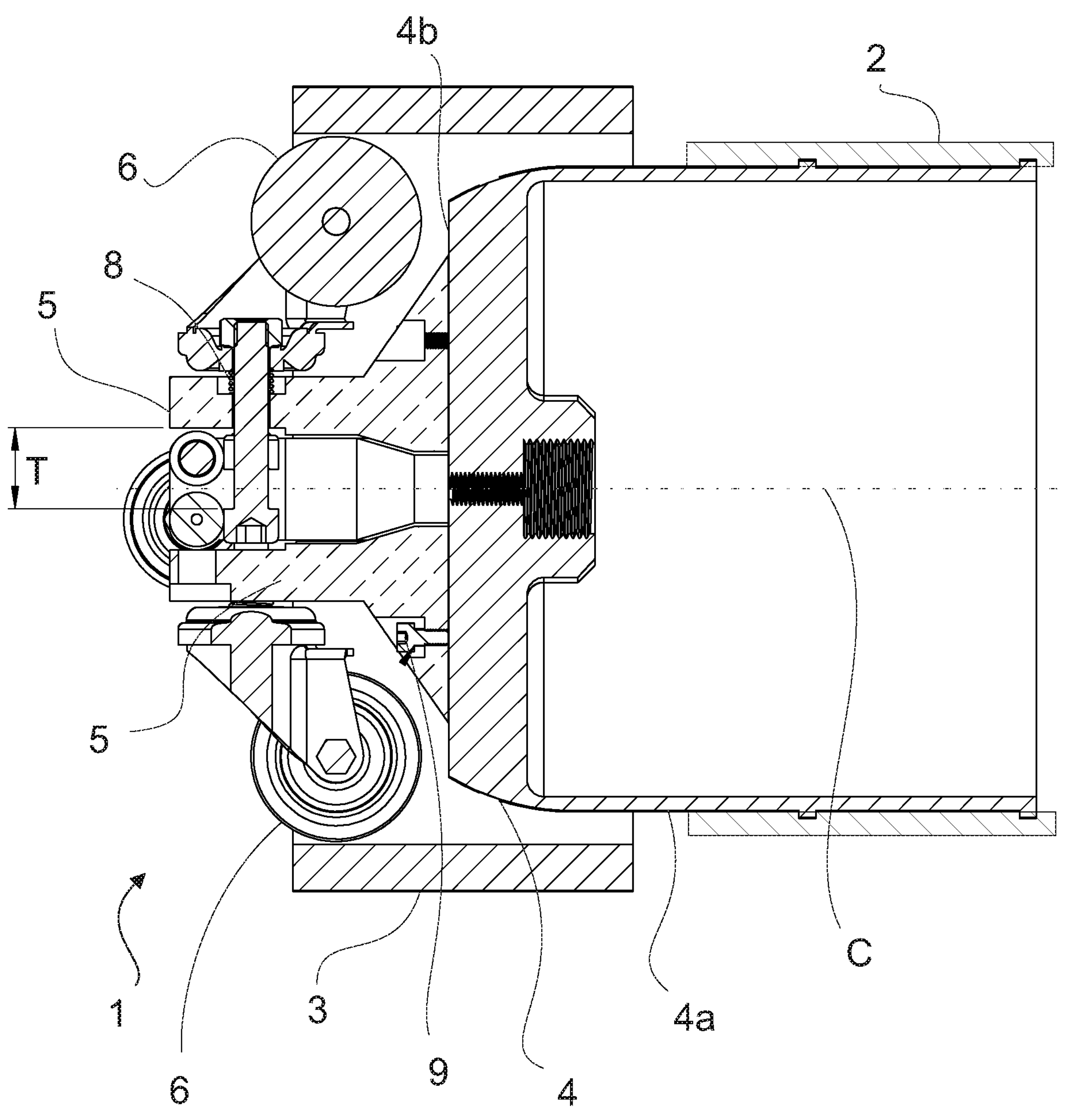
FIG. 3 illustrates a cut view of the guide according to FIG. 1 along line A-A

FIG. 3, in turn, depicts a cut view of the guide 1 along a line A-A illustrated in FIG. 1, arranged in a bladder assembly 10. That is, a bladder 2 is attached to the guide 1, namely the cylindrical section 4*a* of the guide body 4. In practise, at least a part of the guide 1, namely the cylindrical section 4*a* of the guide body 4 is inserted to an opening to the bladder 2. Although not illustrated in FIG. 3, the bladder 2 is typically secured in place around the guide body 4 using, for example, a clamp band, strap, tape and/or an adhesive. It should be noted that in FIG. 3 only a section of the bladder is illustrated for the purpose of clarity. Typically, such a bladder 2 would extend much further longitudinally along central axis C, and may possibly be equipped with a lateral branch section(s). It should also be noted that in typical applications the bladder assembly 10 is provided with a liner (not illustrated) arranged on top of the bladder 2.

FIG. 3 also more clearly illustrates the limited travel allowed for the roller unit 6 by the headed shank connecting the roller unit 6 to the roller bracket 5.

LIST OF REFERENCE NUMERALS

1 guide
2 inflatable bladder
3 pipeline
4 guide body
4*a* cylindrical section
4*b* end surface
5 roller bracket
5*a* protrusion
6 roller unit
7 attachment rail
7*a* slot
8 biasing member
9 locking element
10 bladder assembly
C central axis
T limited travel

The invention claimed is:

1. A guide for guiding an inflatable bladder within a pipeline, comprising a guide body attachable to the inflatable bladder, the guide body defining a central axis;

two or more roller brackets arranged on the body, each roller bracket being equipped with a roller unit for supporting the guide against an inner wall of a pipeline, wherein the guide further comprises an attachment rail extending in a direction transverse with respect to the central axis, wherein at least one roller bracket is arranged on the attachment rail, and the roller bracket arranged on the attachment rail has:

a fixed configuration in which said roller bracket is releasably fixed with respect to the attachment rail and a released configuration, in which said roller bracket is movable between different positions on the bracket rail, wherein at least one roller unit is coupled to its respective roller bracket with a limited travel extending in a direction transverse to the central axis, wherein the guide further comprises a biasing member configured to bias the roller unit with a limited travel outwardly with respect to the central axis along the limited travel, wherein the attachment rail is arranged as a slot on the guide body, wherein the roller bracket arranged on the attachment rail comprises a protrusion having a cross-sectional shape corresponding to that of the slot, and the protrusion is received within said slot, or a protrusion on the guide body, wherein the roller bracket arranged on the attachment rail comprises a slot having a cross-sectional shape corresponding to that of the protrusion, and the protrusion is received within said slot.

2. The guide according to claim 1, wherein the roller unit with limited travel is coupled to the roller bracket arranged on the attachment rail.

3. The guide according to claim 1, wherein the limited travel of the roller unit is arranged parallel with the attachment rail.

4. The guide according to claim 1, wherein the roller bracket arranged on the attachment rail is slidably moveable along said attachment rail when in the released configuration.

5. The guide according to claim 1, wherein the slot and protrusion are of a T-profile cross-sectional shape.

6. The guide according to claim 1, wherein the roller bracket arranged on the attachment rail comprises a locking element movable between a locked position, in which the roller bracket is in the fixed configuration, and a released position, in which the roller bracket is in the released configuration.

7. The guide according to claim 6, wherein the locking element is a longitudinal locking element equipped with an external thread engaging with an internal thread provided on a through hole on the roller bracket, so as to allow the longitudinal locking element to be moved into contact with the guide body, and respectively away from the body.

8. The guide according to claim 6, wherein the locking element comprises a rod extending through the roller bracket and is connected to the protrusion of the roller bracket, wherein protrusion may be moved away from and towards the remaining roller bracket, so as to clamp the roller bracket against the guide body of the guide when in the locked position.

9. The guide according to claim 1, wherein the roller unit is pivotable about a pivot axis transverse to the central axis.

10. The guide according to claim 1, wherein the roller unit comprises an omni-wheel.

11. The guide according to claim 1, wherein the guide body comprises a cylindrical section extending along the central axis and an end surface at a longitudinal end of the cylindrical section, wherein the end surface is arranged transverse with respect to the central axis, and wherein the attachment rail is arranged on the end surface.

12. The guide according to claim 1, wherein guide comprises at least three attachment rails equipped with respective roller brackets and roller units.

13. The guide according to claim 1, wherein the guide comprises a number of roller brackets and respective roller units corresponding to the number of attachment rails.

14. A bladder assembly for installing a pipe liner within a pipeline, comprising a flexible, inflatable bladder having an opening, further comprising a guide according to claim 1 attached to the bladder, wherein the guide is at least partially received within the opening of the bladder such that roller units reside outside the bladder.

* * * * *